A. MEDLER.
BEARING FOR VEHICLE SPRINGS.
APPLICATION FILED JAN. 20, 1916.
1,184,471.
Patented May 23, 1916.
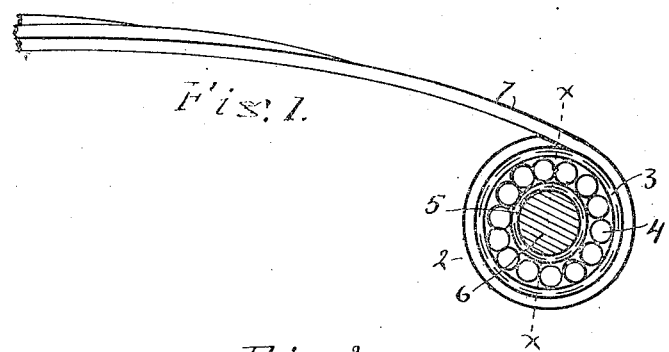
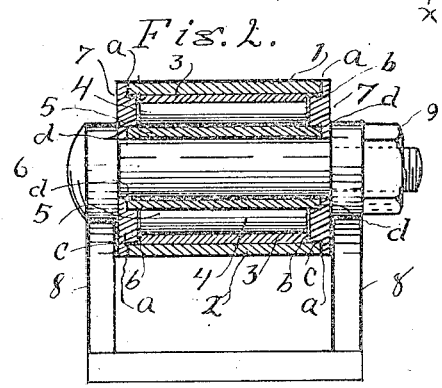
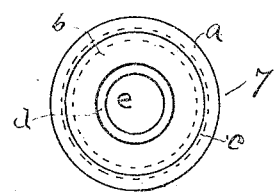
Inventor
Albert Medler
By Ithiel J. Cilley
Attorney

UNITED STATES PATENT OFFICE.

ALBERT MEDLER, OF CORAL, MICHIGAN.

BEARING FOR VEHICLE-SPRINGS.

1,184,471.	Specification of Letters Patent.	Patented May 23, 1916.

Application filed January 20, 1916. Serial No. 73,263.

*To all whom it may concern:*

Be it known that I, ALBERT MEDLER, a citizen of the United States, residing at Coral, in the county of Montcalm and State of Michigan, have invented certain new and useful Improvements in Bearings for Vehicle-Springs, of which the following is a specification.

My invention relates to improvements in appliances for "hanging" automobile springs, and its objects are: first, to provide a means whereby the wearing upon the hangers and supporting bolts will be reduced to the minimum; second, to provide a means whereby a constant supply of grease may be provided upon the hangers without the necessity of constantly renewing the supply, and, third, to provide against the danger of constant jarring and squeaking in the hanger bearings. I attain these objects by the mechanism, construction and distribution of parts disclosed in the accompanying drawing, in which—

Figure 1 is an end view of the bearing with the hanger removed to show the distribution of the several parts, and with the end of the spring in position to show how the bearing is connected therewith; Fig. 2 is a transverse section of the same on the line $x$—$x$ of Fig. 1, and Fig. 3 is a plan of the inner face of the retaining washers.

Similar reference characters indicate similar parts throughout the several views of the drawing.

In the accompanying drawings 1 represents the end of an automobile, or other vehicle, spring, which is formed to a perfect circle as indicated at 2 to closely encircle the thimble 3. This thimble should be made somewhat shorter than the width of the spring 1—2, but of a proper diameter to be firmly gripped within the circle 2 so there can be no possible movement between the two. The part 5 is a second, but smaller, thimble that has an internal diameter of a proper size to fit closely over the bolt 6 to avert any possibility of rattle between this thimble and the bolt 6.

To complete the bearing I provide two end plates, 7—7 cut away at $a$, $c$, to form a receptacle for the end 1, 2 of the spring, in which the spring should be fitted to move freely to meet any variations that may be made in the traveling of the rollers 4, 4 between the thimbles 3 and 5. The inner periphery, or in other words, the inner surfaces of the end pieces, immediately adjacent to the shaft opening $e$, is cut away to form bearings $d$ for the ends of the thimble 5, and one of these bearings, say in the left hand end piece 7, should be made to fit so closely over the end of the thimble as to support it against any possible danger of the thimble falling out with ordinary handling. This for the purpose of holding the thimble safely in place while the rollers 4 are being placed and the other end piece applied.

In assembling this bearing I first force the thimble 3 into the circle 2 at the end of the spring 1. I then force one end of the thimble 5 into its bearing near the center of the end piece 7 that is prepared for this purpose, and then I place the thimble and end piece in position in the end of the spring, substantially as shown, and insert the rollers 4, 4 between the two thimbles. These rollers must be of a proper length to operate freely between the bearings $b$ of the end pieces 7, 7. When the rollers 4 are all properly placed the other end piece 7 is applied, and the assembled bearing is placed between the hangers 8, 8 and the bolt 6 is passed through the tops of the hangers and the thimble 5 of the bearing and the bearing is firmly secured between the hangers by means of the bolt and the nut 9, as indicated in Fig. 2.

The thimble 5 should be of a proper length so that when the bearing is placed in the hangers and properly secured therein, as hereinbefore suggested, it will form an efficient support for the end pieces 7, 7 and will hold them far enough apart to provide free movement for the spring bearing 1, 2, so the rollers may have full efficiency. With this construction and arrangement of parts, though there is no part revolving, the constant vibration of the spring 1, as the vehicle is moving rapidly over ordinary road beds, will cause the rollers to move slightly with each motion of the spring, thus keeping them constantly revolving around the bolt, or, better, the thimble 5 and averting the danger of undue wear upon the bolt 6, common when the end of the spring is connected directly upon the bolt, common in all vehicles now in use. When this bearing is being assembled the rollers 4 should be thoroughly greased with a hard, practically unmeltable lubricant of a proper consistency to work well upon the rollers but not to drip or leak out of the bearing casings.

While the rollers might be applied without the use of the thimbles 3 and 5, the bearing would not be as satisfactory, for the reasons, first, that it would be very hard and expensive to form bearings directly with the ends of the spring that would not wear badly on the rollers, and, second, it would be very hard to insert and retain the rollers without the thimble 5 as they could not be inserted before the bolt 6 was placed in the hangers, and there would not be room to insert them after the bolt was set, especially as the end pieces must be placed in position before the spring is placed between the hangers.

What I claim as new, and desire to secure is:—

1. In combination with the supporting hanger, the supporting bolt, and a vehicle spring; a circle formed at the end of the spring, a thimble securely mounted in the circle, a thimble securely mounted on the bolt, rollers mounted to revolve freely between the thimbles, and end pieces mounted on, and concentric with the bolts to close the ends of the thimbles.

2. In combination with the end of a vehicle spring, a spring hanger, a supporting bolt mounted in the hanger, and a circle formed at the end of the spring; a thimble securely mounted in the circle, a thimble securely mounted around the bolt, and end pieces fitted to form solid bearings with the thimble around the bolt, and freely moving bearings between the thimbles.

3. In combination with a vehicle spring, a spring hanger, a supporting bolt securely mounted in the hanger, and a circle formed at the end of the spring, a thimble securely mounted in the circle, a thimble securely mounted on the bolt, free moving rollers mounted between the thimbles, end pieces mounted on, and concentric with the bolt and having a part of the rims cut away to form receptacles for the free movement of the circle on the spring, the ends also cut away at the centers to form firm bearings with the thimble that is mounted on the bolt, and means for clamping the bearing firmly.

Signed at Coral Michigan January 10, 1915

ALBERT MEDLER.